July 30, 1946.　　L. G. BOSTWICK ET AL　　2,404,785
ELECTROMECHANICAL DEVICE
Filed June 5, 1942　　5 Sheets-Sheet 1
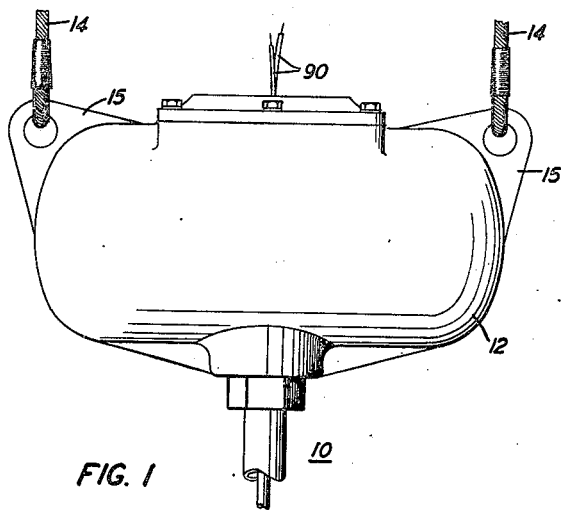
FIG. 1
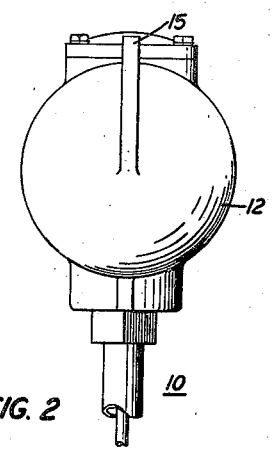
FIG. 2
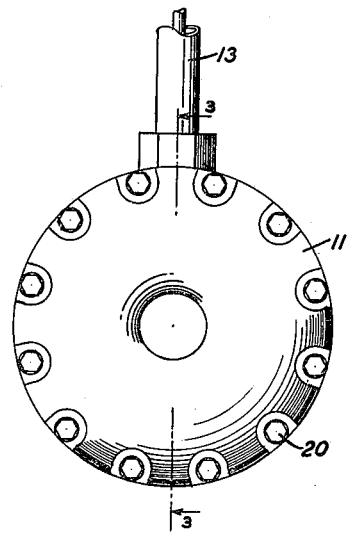
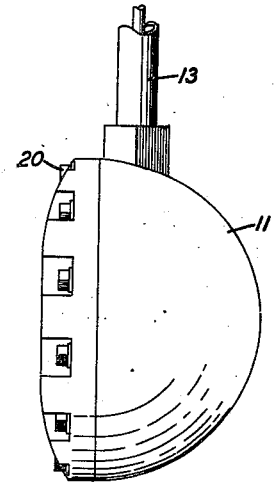
INVENTORS L. G. BOSTWICK
J. H. KING
BY
Robert J. Pluskey
ATTORNEY July 30, 1946.   L. G. BOSTWICK ET AL   2,404,785
ELECTROMECHANICAL DEVICE
Filed June 5, 1942   5 Sheets-Sheet 3

INVENTORS L. G. BOSTWICK
J. H. KING
BY
Robert J. Pluskey
ATTORNEY

July 30, 1946.  L. G. BOSTWICK ET AL  2,404,785
ELECTROMECHANICAL DEVICE
Filed June 5, 1942   5 Sheets-Sheet 4
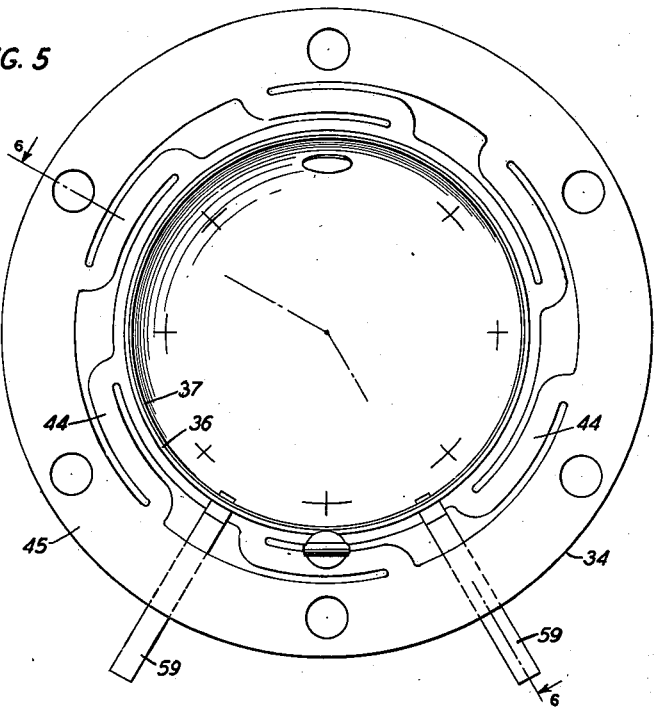
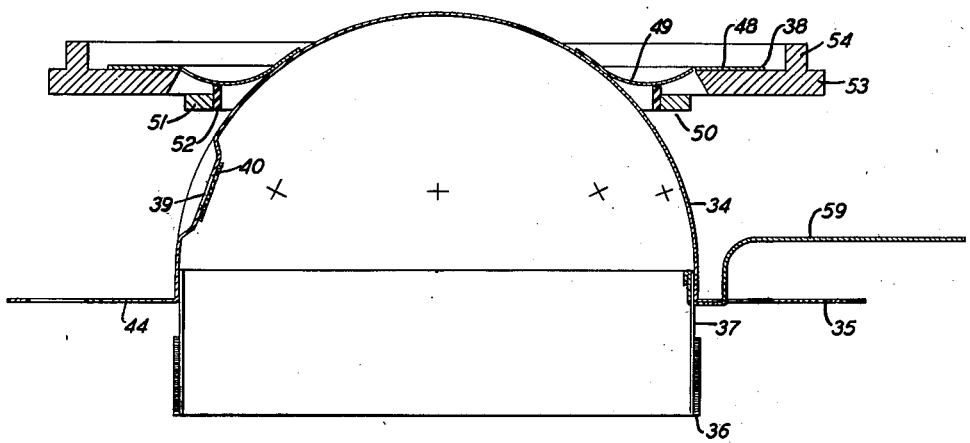
INVENTORS L. G. BOSTWICK
J. H. KING
BY
Robert J. Pluskey
ATTORNEY

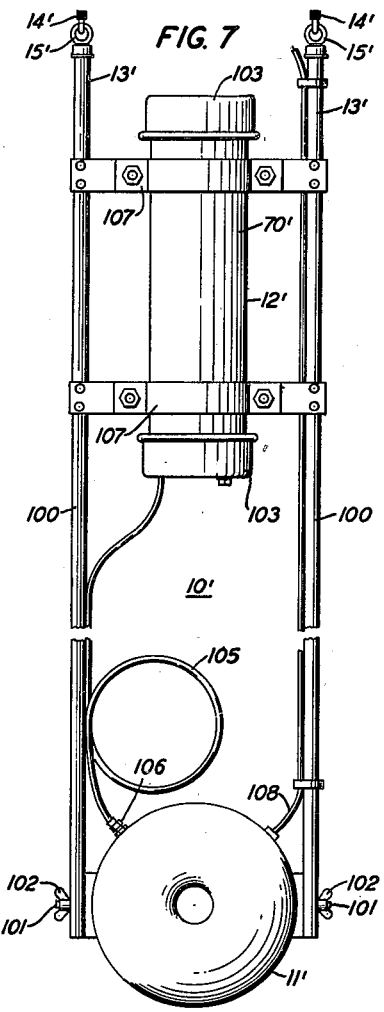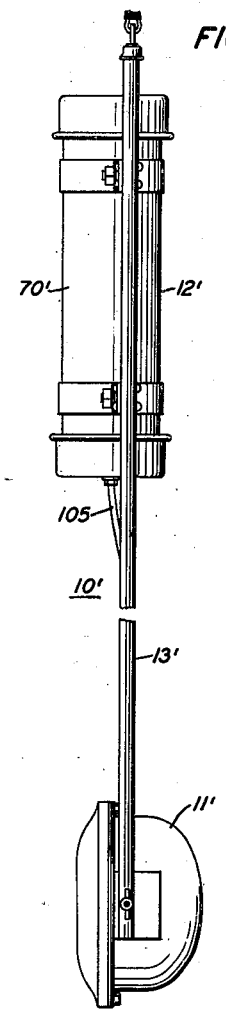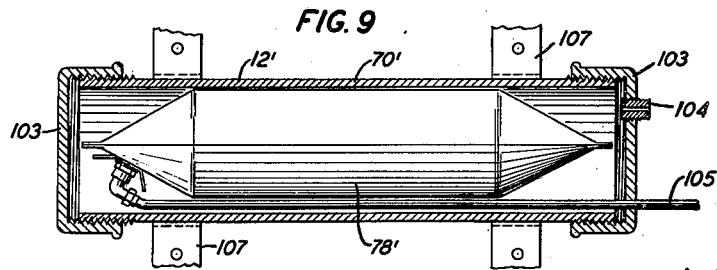

Patented July 30, 1946

2,404,785

UNITED STATES PATENT OFFICE 2,404,785

ELECTROMECHANICAL DEVICE

Lee G. Bostwick and John H. King, Chatham, N. J., assignors to Bell Telephone Laboratories, Incorporated, New York, N. Y., a corporation of New York Application June 5, 1942, Serial No. 445,974

15 Claims. (Cl. 181—0.5)

This invention relates to electromechanical devices and, more particularly, to submarine signaling devices.

An object of the invention is to improve the structure and the operating characteristics of such devices and, more particularly, of submarine signal wave projectors or radiators.

Submarine signal devices are known in which the hydrostatic pressure on the moving system or diaphragm of the device is compensated or balanced, for example, by gaseous pressure on the non-exposed side of the diaphragm. The means enabling such pressure compensation or balancing has customarily been relatively closely associated with the structure including the diaphragm, particularly when the hydrostatic pressure has been availed of to develop the balancing gaseous pressure in a system involving a compressible member, such as a bellows or a collapsible container or bag. Such arrangement limits the efficiency of radiation of the projector, particularly at the low audio frequencies because of the signal wave power absorbing tendency of the compressible member.

One feature of this invention comprises so arranging the components of a submarine signal device that there is always a positive pressure or force acting on the surface of the radiating member or diaphragm that is exposed to the water.

Another feature comprises enclosing the compressible member of the hydrostatic pressure compensating means in a rigid container, and spacing the latter from the structure enclosing the diaphragm and its associated components at a distance approximately equal to or greater than one-quarter of the wave-length of the frequency at which the rigid container may be resonant.

A further feature comprises mounting the diaphragm in the opening of a water-tight hollow enclosure with a flexible inwardly bowed flange member or portion constituting a seal between the diaphragm and the enclosure, and also functioning to restrict the diaphragm area exposed to the water.

Still another feature comprises an arrangement such as is referred to in the preceding paragraph in which the bowed flange member is damped or loaded to compensate for or to annul any inherent tendency to develop parasitic vibration.

A more complete understanding of the invention will be derived from the detailed description that follows taken in conjunction with the appended drawings, wherein:

Fig. 1 shows a front elevational view of a submarine signal wave projector or radiator embodying the features of the invention;

Fig. 2 shows a side elevational view of the device of Fig. 1;

Fig. 5 is a plan view of the diaphragm of the transducer shown in Fig. 3;

Fig. 6 is a cross-sectional view of the diaphragm and associated diaphragm-area restricting bowed flange member of the transducer of Fig. 3, taken along the line 6—6 of Fig. 5;

Figs. 7 and 8 show front and side elevational views, respectively, of another embodiment of the invention; and Fig. 9 is a cross-sectional view of the hydrostatic pressure compensator or balancing means included in the device of Figs. 7 and 8.

Figs. 1 to 6 illustrate one embodiment of this invention. Such embodiment is a wide frequency range sound source, projector or radiator 10, adapted to be immersed in, and to radiate audio frequency or supersonic energy into, a liquid medium, for example, the water of a river, lake, sea or ocean.

Figure 3:
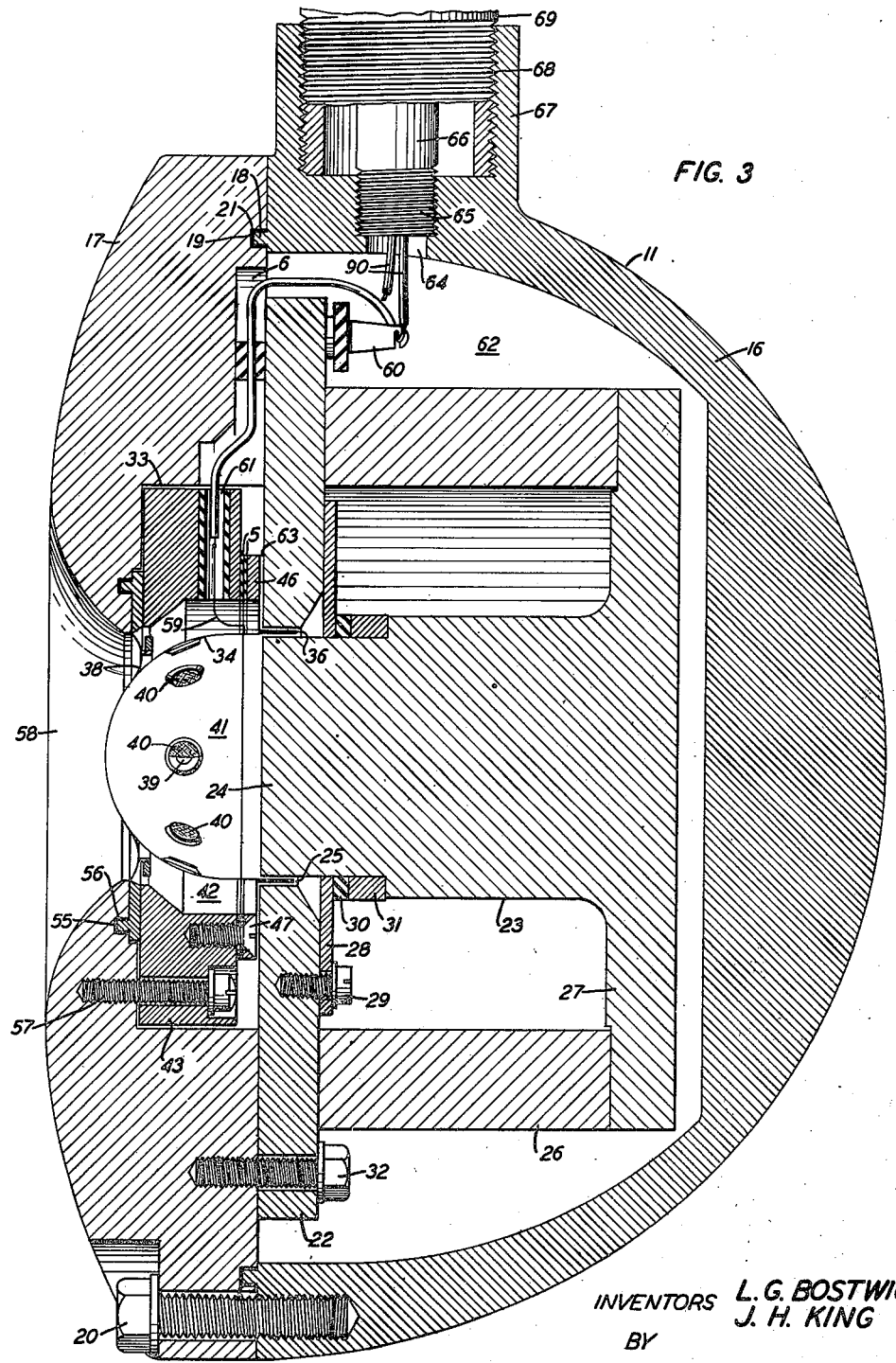
Fig. 3 shows a cross-sectional view, taken along the line 3—3 of Fig. 1, of the electromechanical transducer and its enclosure embodied in the device of Fig. 1.

The sound projector 10 comprises an energy radiating device or portion 11, a hydrostatic pressure compensating or balancing device or portion 12, and rigid means 13 interconnecting the devices 11, 12 whereby the projector 10 constitutes a unitary structure that may be supported under water at the end of suitable wires or cables 14 engaging with the ears or projections 15 on portion 12.

The device 11 comprises a casing or container 16 and a front plate or cover member 17, each being of a cast bronze alloy and of rigid construction. The planar rim portion of the casing 16 includes an annular ridge 18 that fits into an annular recess 19 in the member 17, the latter being secured to the casing by a plurality of fastening members 20. The recess 19 contains a gasket 21 of elastic material, such as rubber, that constitutes a seal against the flow of water into the casing, or the release of gaseous pressure that may be developed within the device 11.

The cover member constitutes a support for an electromechanical transducer of the moving coil type that is enclosed by the casing 16 and cover member 17, but that is mounted on the cover member independent of the casing.

The electromechanical transducer comprises a magnetic structure that may consist of an annular plate pole 22, for example, of magnetic iron; a center pole member 23, for example, of a low carbon magnetic steel, the member 23 having a cylindrical portion 24 projecting into the central aperture of the plate pole 22 and defining an annular air gap 25 therewith; and an annular permanent magnet 26, for example, of an aluminum-nickel-cobalt steel, clamped between the plate pole and the peripheral portion of an outwardly projecting flange portion 27 forming part of the center pole. A thin plate member 28, for example, of brass, with a central opening to enable it to make a sliding fit with the center pole portion 24, is fastened to the under side of the plate pole by a plurality of spaced members 29 that project oversize passages in the member 28 to permit accurate centering of the center pole in the plate pole opening before the members 29 are tightened into place. The plate 28 closes one end, that is, the inner end of the air-gap, the gasket 30, for example, of soft rubber being inserted between the plate 28 and the spacer 31 to prevent air flow through the space between the plate 28 and the center pole. The magnetic structure described is suspended from or mounted on the inner surface of the cover member 17 by a plurality of fastening devices 32.

The movable portion or structure of the transducer is mounted on the cover member within a circular recess 33. It may consist of a hemispherical or dome-shaped diaphragm, for example, of thin sheet metal 34, having an integral planar flange portion 35; a moving coil 36, for example, of insulated, edge wound aluminum ribbon, secured to an annular coil form 37, the latter being fastened to the diaphragm; and an annular flange member 38, for example, of metallic sheet material, whose inner peripheral portion engages with the outer surface of the diaphragm and restricts the area of the latter that is exposed to the liquid medium.

The diaphrgm 34 may be of a beryllium copper alloy and be formed from sheet material .012 inch in thickness. It may be provided with a plurality of equally spaced circular apertures 39, pads or discs 40 of acoustic damping material, such as silk cloth, being secured over the apertures on the inner surface of the diaphragm. These apertures and cloth discs interconnect the space or chamber 41 between the diaphragm and the center pole with the space or chamber 42 formed by the outer surface of the diaphragm, the flange member 38, and the clamping member or ring 43. The integral flange 35 comprises an annular flexible portion formed by removing some of the material to provide flexible connectors 44 joining the stiffened central portion of the diaphragm and the planar mounting or rim portion 45, the latter being positioned between insulating washers 5 and clamped against the member 43 by the clamping ring 46 and fastening members 47.

The member 38 may be of beryllium copper alloy formed from a sheet material approximately .0015 inch in thickness. It has an outer planar rim portion 48 and an inner, inwardly bowed or concave portion 49. A damping unit 50 comprising a metallic ring 51, for example, of copper supported on an annular form 52, for example, of a material such as Viscoloid, is secured to the inner or convex surface of the portion 49 of member 38, along a line approximately midway between the lines of contact of portion 49 with the diaphragm and with the support or annulus 53 to which the rim portion 48 of member 38 is secured, for example, by being soldered or welded thereto. The support 53 is clamped to the cover member by the member 43, such that the ridge 54 is forced into the recess 55 containing a suitable water-excluding gasket 56. A plurality of spaced members 57 secure the clamping ring 43 to the cover member. With the magnetic structure and the vibrating system of the transducer arranged as described, the coil 36 is positioned and centered in the air-gap 25 and the central opening 58 in the cover member is closed by the diaphragm and the member 38. The leads 59 for the coil are brought out to terminals 60 mounted on the underside of the plate pole, through insulation-lined passages 61 in the member 43 and recess 6 in the cover member. The space or chamber 41 connects with the space or chamber 62 in the casing through the passages 61 and recess 6, and also through the restricted passage or slot 63. The casing has a tapped aperture 64 to which is coupled the threaded extremity 65 of the rigid tube or pipe 66 constituting a component of the means 13 for interconnecting the devices 11, 12. The casing also includes an outwardly projecting flange 67, tapped interiorly for engagement by the threaded extremity 68 of a second rigid tube or pipe 69 concentric with and enclosing the tube 66. The tube 66 provides a conduit for the wires or conductors connecting the terminals of the transducer with suitable electrical equipment and circuits (not shown) constituting the source of the signal to be translated by the transducer and, through its vibrating system, radiated into the liquid medium. The tube 66 also provides an air or other gas passage between the devices 11, 12.

The device 12 may comprise a rigid casing or container 70, substantially cylindrical in shape with rounded end portions and of a material such as a bronze alloy. The container 70 has a passage 71 in its cylindrical wall portion, defined in part by the internally threaded flange 72 with which the upper threaded end 73 of the pipe 68 is in engagement. The upper extremity 74 of the inner pipe 66 threads into a tapped bore in a valve coupler 75 of which more hereinafter. A cover member 76 is removably attached to the container 70 over an opening 77 therein through which a cylindrical bag or bellows 78 of an elastic material, such as rubber, may be introduced into the container. This bag is provided with a valve 79 coupled to the valve coupler 75 by metal tubing 80 and a suitable union 81 whereby the interior 82 of the bag is connected through such tubing, the passage 83 of the coupler 75 and the pipe 66 with the chamber 62 of the device 11 and, consequently, the chambers 41, 42. The bag 78 and the passages and chambers connected with its interior 82 may be filled with air or other gas at atmospheric or other pressure, the petcock 84 on valve 79 being provided to enable the desired adjustment in these respects. The liquid medium may have access to the interior of the container 70 (but not to the interior of the bellows) through an opening 85; obviously, suitable spacer members could be inserted between the container 70 and the peripheral portion of the cover member, or the latter could be suitably shaped, to provide one or more passages for the ingress of water. With such alternative construction the conductors 90 might be brought out through a suitable gland attached to the cover 76. The opening 85, or such other openings as are provided for the same purpose, preferably are proportioned so as to offer a high impedance to signal waves in the frequency range that the projector is intended to radiate. It is not objectionable if some of the liquid medium enters the space between the pipes 66, 68; the outer pipe constitutes primarily a rigid mechanical connection between the devices 11, 12. The conductors 90, for connecting the transducer with a source (not shown) of signal current outside (for example) of the liquid medium, may pass through the opening 85 and, where they pass into the pipe 66 through the coupler 75, are surrounded by a water tight gland 91.

Figure 4:
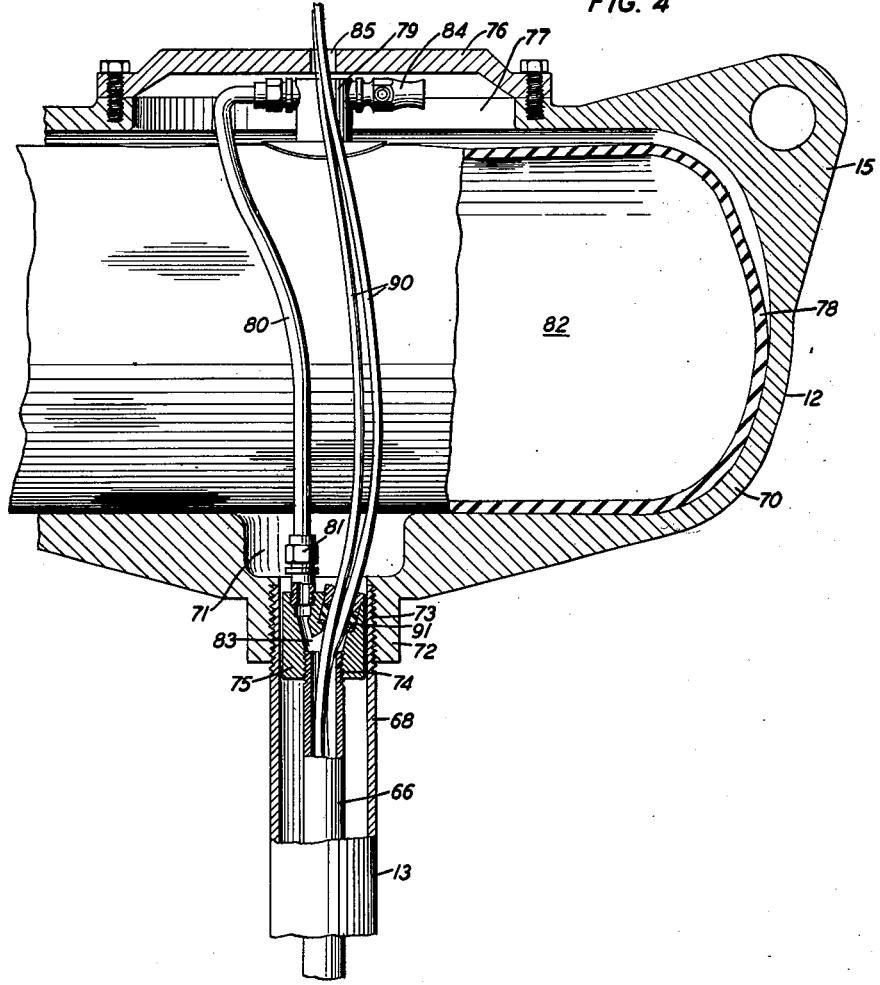
Fig. 4 shows, partly in section and partly broken away a fragment of the hydrostatic pressure compensator or balancing means included in the device of Fig. 1.

The vibrating system of the transducer of this invention is adapted and intended to move substantially as a whole, that is, like a piston, when signal current is caused to flow in the moving coil. An electromechanical transducer of this type is disclosed in the pending application of L. G. Bostwick, Serial No. 339,261, filed June 7, 1940, for Acoustic devices. As pointed out in that application, an efficient magnetic system requires a moving coil and diaphragm of such proportions that the area of the diaphragm may be too large for the most efficient transformation of energy between the vibrating system and the water, and it is demonstrated that the most efficient transformation is obtained when the ratio of the radiation masses of the water and of the moving system is of the order of two to one. By restricting the area of the diaphragm exposed to the water, this relation may be attained. In the device described with reference to Figs. 1 to 6 herein, the diaphragm area exposed to the water is restricted by the annulus 38, the inclusion of the preshaped or preformed grooved or concave portion in the annulus 38 enabling the obtaining of an improved radiation characteristic for the moving system. To ensure that the grooved portion shall retain its shape, it is desirable that the force acting on the exposed surface of the diaphragm and annulus shall always be such as to force the diaphragm inwardly, that is, in a direction toward the magnetic structure of the transducer. This is provided for by positioning the hydrostatic pressure compensating means, that is, the bellows 82, at such a distance above the device 11, that the gaseous pressure developed on the inner or non-exposed surface of the diaphragm by the compressive action of the water on the bellows is less than the hydrostatic pressure at the device 11 by the head of water between the devices 11, 12.

The inventors have determined that, when hydrostatic pressure compensating means comprising a compressible body, such as the bag or bellows 82, is employed, the radiation efficiency of the transducer is affected both by the resonance characteristic of the compensating means and the spacing of the latter from the transducer. The container 70, therefore, is so constructed as to be non-resonant over the low frequency band in which the device 11 is designed to radiate signal waves into the water; and is spaced from and above the device 11 a distance approximately equal to or greater than one-quarter of the wave-length at the higher frequencies when the container 70 may be resonant.

The annulus 38 evidences a tendency to break up in the signaling frequency range, in a specific embodiment of the invention, above about 4000 cycles per second, and thereby to cause loss in the radiated energy. The association of damping means 50 with the concave portion 49 compensates for this tendency, the ring 52 constituting a compressible dissipative element and the ring 51 a mass element. For frequencies of vibration below that at which the portion 49 would tend to break up, the means 50 tends to move as a whole with the portion 49; at higher frequencies the Viscoloid acts as a cushion or absorber with respect to parasitic vibrations that tend to develop in the portion 49. The annulus 38 may be considered as stiff to compression, flexible at its articulations or hinges with the diaphragm and the support 53, and damped. In a specific embodiment, the added mass of the damping means 50 was of the order of 3 grams, as compared with about 25 grams for the vibrating system. The resonant frequency of the vibrating system is at the lower end of the audio frequency range. The chamber stiffness on the inner surface of the diaphragm is maintained low as a result of the interconnecting of the chambers 41, 42 through the passages 39, the discs 40 introducing damping at low frequencies.

In Figs. 7, 8 and 9 is illustrated a submarine signal radiator or projector 10′ constituting a modification of the arrangement of Figs. 1 to 6. It comprises an energy radiating device or portion 11′, a hydrostatic pressure compensating or balancing device or portion 12′, and rigid means 13′ interconnecting the devices 11′, 12′, whereby the projector 10′ constitutes a unitary device that may be supported under water at the ends of suitable wires or cables 14′ engaging with the eyelets 15′ at the upper ends of the parallel rods or pipes 100 constituting the means 13′. The device 11′ is supported between the lower ends of the rods 100, and may be arranged for adjustment through a desired angle from the vertical by rotation on the threaded projections 101 engaged by the clamping members 102. Although the enclosure of the device 11′ may present an appearance different from that of the device 11 of Figs. 1 to 6, the transducer embodied in it may be the same as that of Figs. 1 to 6, and the enclosure itself be constructed in rigid, non-resonant manner. The device 12′ comprises a rigid container or casing 70′, cylindrical in shape with removable end portions or caps 103, and secured to the rods 100 by clamps 107. One end portion contains a restricted passage 104 for the ingress of water to the inside of the container, the proportions of the passage being such, however, that a very high impedance is offered to signal wave disturbances in the water. A collapsible or compressible bag or bellows 78′ of elastic material is enclosed in the container, the interior of the bellows being connected through a suitable conduit or tubing 105 and coupling 106 with the interior of the enclosure of the device 11′, whereby volume change in the bellows 78′ because of hydrostatic pressure thereon produces gaseous pressure within the device 11′ to oppose the hydrostatic pressure exerted by the water on the exposed surface of the diaphragm of device 11′. As with the arrangement of Figs. 1 to 6, the devices 11′, 12′ are spaced at a distance equal to or greater than approximately one quarter of the wave-length of the frequency at which the container 70′ is proportioned to be resonant. Electrical connection of the device 11′ with a suitable source (not shown) of signal current to be translated by the device 11′ and radiated into the liquid medium, may be made through the conductors of a cable 108.

Although this invention has been disclosed with reference to particular embodiments thereof, it is to be understood that it is not limited thereto but is of a scope that is evidenced by the appended claims.

What is claimed is:

1. A submarine signaling device comprising a diaphragm having a portion bowed outwardly with respect to the water, and a centrally apertured member of sheet material secured at its inner peripheral portion to said diaphragm portion to restrict the area of the latter exposed to the water, said sheet member being bowed oppositely to that of the diaphragm.

2. A device as claimed in the preceding claim in which damping means is attached to said sheet member.

3. A device as claimed in claim 1 in which damping means is attached to said sheet member, said means comprising a dissipative member secured to said sheet member and a mass member supported by said dissipative member.

4. A submarine signaling device comprising a diaphragm having a portion presenting a convex surface to the water, and a centrally apertured member of sheet material secured at its inner peripheral portion to the convex surface of the diaphragm to isolate a portion of the latter from the water, said sheet member comprising a portion presenting an annular concave surface to the water.

5. A submarine signaling device comprising a diaphragm having a portion presenting a convex surface to the water, said diaphragm portion having a circular base, and a member of sheet material containing a circular aperture smaller than the base of said diaphragm portion and including an annular portion presenting a concave surface to the water, said diaphragm portion projecting through the circular aperture of the sheet member and being secured to the latter.

6. A submarine signaling device comprising a signal wave radiating member bowed outwardly with respect to the water and a centrally apertured sheet metal member secured at its inner peripheral portion to said radiating member to isolate a portion of the latter from the water, said sheet member being bowed oppositely to that of the radiating member.

7. A submarine signaling device comprising an electro-mechanical transducer including a diaphragm, a water-excluding enclosure for said transducer having an opening through which one surface of the diaphragm is exposed to the water, means for compensating for hydrostatic pressure on the exposed surface of the diaphragm, said means comprising a compressible hollow member connected with the interior of said enclosure whereby volume change in said hollow member because of hydrostatic pressure thereon produces pressure on the inner surface of said diaphragm opposite to the pressure on the exposed surface of the diaphragm, and a rigid container for said hollow member, said container being spaced from said transducer approximately one-quarter of the wave-length of the frequency at which the container is resonant.

8. A submarine signaling device according to the preceding claim in which said container is mounted with respect to said transducer so that the hydrostatic pressure on said hollow member is always less than that on the exposed surface of the diaphragm.

9. A submarine signaling device according to claim 7 in which said transducer and said container are so relatively positioned in the water that the resultant pressure on the diaphragm is always such as to force said diaphragm inwardly with respect to the enclosure.

10. A submarine signaling device comprising an electro-mechanical transducer including a diaphragm, a water-excluding hollow enclosure for said transducer having an opening through which one surface of the diaphragm is exposed to the water, a centrally apertured member of sheet material secured at its inner periphery to said diaphragm to restrict the area of the latter that is exposed to the water and secured at its outer periphery to said enclosure, said sheet member having a portion bowed inwardly with respect to said enclosure, and means to maintain the hydrostatic pressure on said diaphragm and sheet member such that there is always a pressure on the diaphragm tending to force it inwardly with respect to the enclosure when the latter is in the water.

11. A submarine signaling device as claimed in the preceding claim in which said means comprises a compressible hollow member connected through said enclosure with the inner surface of said diaphragm and sheet member, whereby volume change in said hollow member because of hydrostatic pressure thereon produces pressure on said inner surface opposite to the pressure on the exposed surface of the diaphragm and sheet member.

12. A submarine signaling device as claimed in claim 10 in which said means comprises a compressible hollow member connected through said enclosure with the inner surface of said diaphragm and sheet member, whereby volume change in said hollow member because of hydrostatic pressure thereon produces pressure on said inner surface opposite to the pressure on the exposed surface of the diaphragm and sheet member, said hollow member and said enclosure being so relatively supported in the water that the hydrostatic pressure on said hollow member is always less than on said enclosure.

13. A submarine signaling device comprising an electromechanical transducer, a rigid, hollow enclosure for said transducer, a compressible hollow member connected with said enclosure and the volume change in which under hydrostatic pressure produces a pressure in said enclosure opposite to that of the hydrostatic pressure on said enclosure, and a rigid container for said hollow member, said enclosure and said container being spaced at a distance approximately equal to one-quarter of the wave-length of the frequency at which the container is resonant.

14. A device as claimed in the preceding claim in which said container and said enclosure are spaced apart by rigid members, said enclosure being positioned below said container.

15. A device as claimed in claim 13 in which said container and said enclosure are mechanically connected by a rigid member of cross section small compared to that of the container and of the enclosure, the latter being suspended from the container by said rigid member.

LEE G. BOSTWICK.
JOHN H. KING.